Sept. 24, 1963 P. C. VANDER AREND ETAL 3,104,953
METHOD OF REACTIVATING AN ADSORBER
Filed July 9, 1958
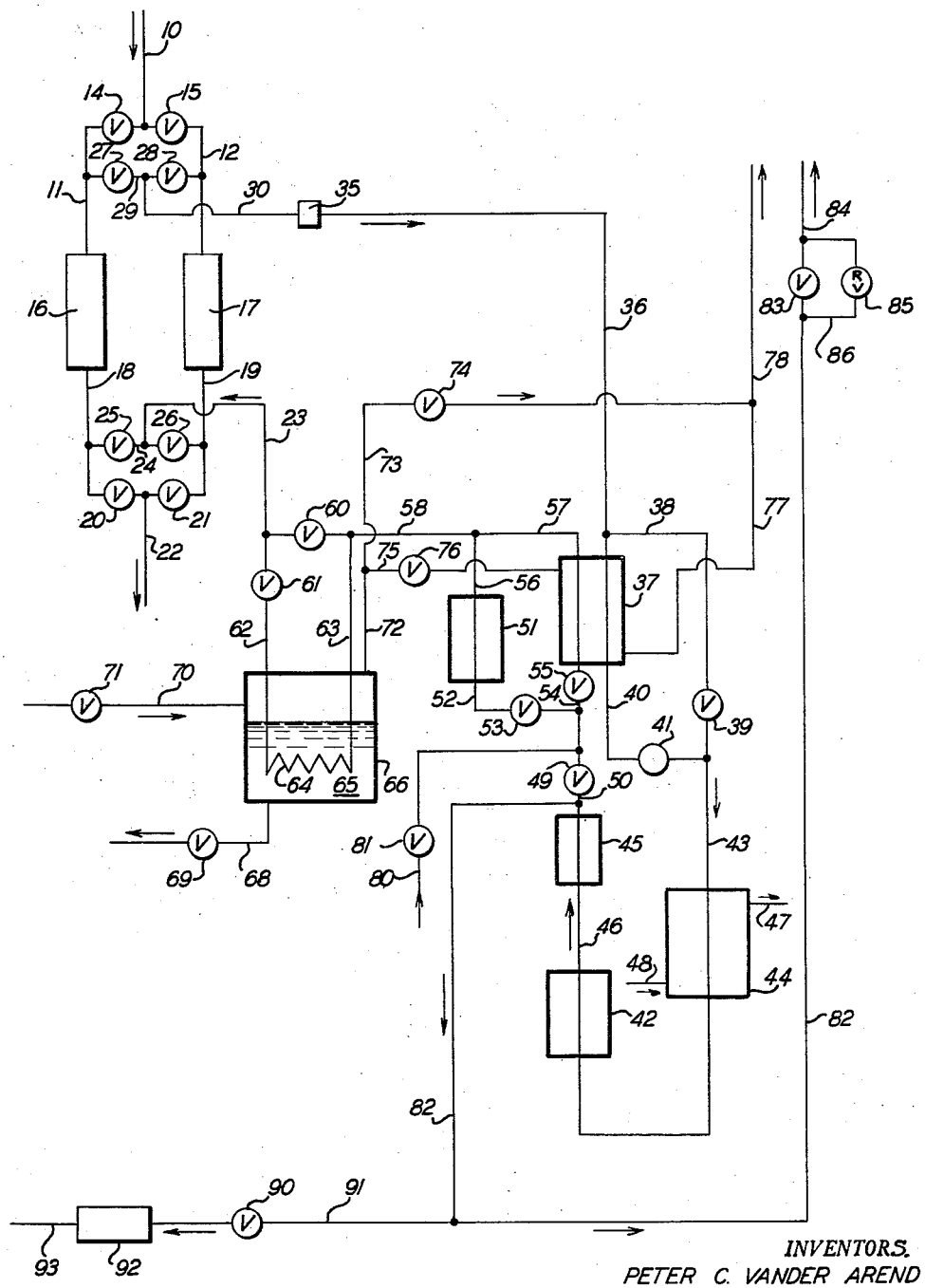
INVENTORS.
PETER C. VANDER AREND
LEE S. GAUMER, JR.
Shanley & O'Neil
ATTORNEYS

United States Patent Office 3,104,953
Patented Sept. 24, 1963

3,104,953
METHOD OF REACTIVATING AN ADSORBER
Peter C. Vander Arend and Lee S. Gaumer, Jr., Allentown, Pa., assignors, by mesne assignments, to Air Products and Chemicals, Inc., Trexlertown, Pa., a corporation of Delaware
Filed July 9, 1958, Ser. No. 747,429
11 Claims. (Cl. 34—13)

This invention broadly relates to the purification of a stream of fluid material by means comprising a purifier and, more particularly, the invention relates to a novel method for the reactivation of purifiers.

The present invention will be described hereinafter with specific reference to the reactivation of prior art adsorbers which are of the class operated at a relatively low temperature to adsorb impurities from a stream of fluid material and reactivated by warming at a relatively high temperature to desorb the adsorbed impurities. However, it is expressly understood that the invention is not limited thereto, and that still other types of prior art purifiers of the class operated at a relatively low temperature and reactivated at a relatively high temperature may be reactivated in accordance with the invention. For example, prior are accumulators operated at low temperatures for freezing out and thus removing carbon dioxide from an atmospheric air feed may be reactivated in accordance with the invention.

The method of the present invention may be used in connection with the purification by means comprising adsorbers of a stream of any suitable fluid feed material. However, the invention is particularly advantageous in instances where large quantities of adsorbent normally are required and where it is desirable or necessary that the fluid feed mixture be purified under high pressure and at low temperature to produce a low temperature, high purity product under high pressure. The present invention offers further important advantages where an inexpensive, low temperature, substantially impurity-free by-product under high pressure is not readily available for reactivation of the adsorbers, and where a portion of the impurity-free product resulting from the purification step is used for this purpose.

In accordance with one embodiment of the present invention, a purifier to be reactivated may be warmed and collected impurities removed by passing a warm fluid stream of reactivating material into the purifier, and then removing reactivating material containing impurities therefrom. Then, fluid material may be charged into a circuit including the purifier and the purifier cooled down, preferably to a temperature in the vicinity of the operating temperature, by recirculating the charge of fluid material through the circuit with cooling. The resulting cooled reactivated purifier then is ready for placing on stream for removal of impurities from a fluid feed material to be purified. In accordance with still another embodiment of the invention, apparatus is provided for carrying out the above method of reactivation and conditioning of purifiers.

It is an object of the present invention to provide a novel method of reactivating purifiers for removing impurities from a stream of fluid material which are of the class operated at a relatively low temperature to remove impurities from the fluid material and reactivated at a relatively high temperature to remove the collected impurities.

It is still a further object of the present invention to provide a novel method of reactivating adsorbers for removing impurities from a stream of fluid material which are of the class operated at a relatively low temperature to adsorb impurities from the fluid material and reactivated at a relatively high temperature to desorb the adsorbed impurities.

Still other objects and advantages of the present invention will be apparent to those skilled in the art upon reference to the following detailed description and the drawing, which diagrammatically illustrates one presently preferred arrangement of apparatus for use in reactivating adsorbers in accordance with the method of the invention.

Referring now to the drawing, a stream of fluid material containing impurities enters the purification system via conduit 10. The conduit 10 is connected through conduits 11 and 12 and switching valves 14 and 15 to adsorbers 16 and 17, respectively; while adsorbers 16 and 17, in turn, are connected through conduits 18 and 19 and switching valves 20 and 21, respectively, to conduit 22 from which fluid material substantially free of undesirable impurities is withdrawn. The adsorbers 16 and 17 may be of prior art construction and may be of the class operated at a relatively low temperature to adsorb impurities from a stream of gaseous feed material and reactivated by a method including warming to a relatively high temperature to desorb the adsorbed impurities. The adsorbers 16 and 17 may be packed with an effective prior art adsorbent for the specific impurity to be adsorbed from a given fluid material, such as silica gel when the impurity is oxygen and/or nitrogen in a hydrogen-rich gaseous mixture, or carbon dioxide and/or hydrocarbons in atmospheric air.

The adsorbers 16 and 17 are provided in duplicate and, by proper operation of valves 14, 15, 20, 21, 25, 26, 27 and 28, one adsorber may be maintained onstream for adsorption of impurities from the feed material while the other adsorber is offstream for reactivation. Broadly stated, during the reactivation cycle warm and then cold streams of fluid materials are passed to adsorber 16 or 17 via conduit 23, conduit 24, and conduit 18 or 19 dependent upon the position of valves 25 and 26, respectively. The streams of fluid material are preferably purified fluid product but other fluids may be used provided their freezing point is sufficiently low so as to remain in fluid phase and the gas can be tolerated in small percentages in the purified product. The warm and cold fluid streams are passed through adsorber 16 or 17 in direct heat exchange effecting relation with the adsorbent and withdrawn via conduit 11 or 12, conduit 29 including open valve 27 or 28, respectively, and conduit 30. For example, when adsorber 16 is onstream and adsorber 17 is offstream, valves 14, 20, 26 and 28 are open, valves 15, 21, 25 and 27 are closed, and the warm and cold fluid streams are passed to adsorber 17 via conduit 23, conduit 24 including open valve 26 and conduit 19, and then withdrawn from adsorber 17 after passage therethrough via conduit 12, conduit 29 including open control valve 28, and conduit 30. While adsorber 17 is offstream for reactivation, the fluid stream of feed mixture to be purified is passed to adsorber 16 via conduit 10 and conduit 11 including open valve 14, contacted with the adsorbent in adsorber 16 where the impurities are adsorbed, and then a purified fluid stream of the material is withdrawn via conduit 18 including open valve 20 and conduit 22.

The warm and cold fluid streams passed through adsorbers 16 and 17 as above described preferably are recirculated through a closed circuit including the adsorbers which is of a suitable construction for circulating fluids. Additional heat or cold, as the need may be, preferably is supplied to the recirculating streams at a suitable point or points in the circuit for the purpose of warming or cooling the adsorber being reactivated. In one presently preferred embodiment of the invention, the temperature of the warm and cold streams withdrawn via conduit 30 from the adsorber 16 or 17 being reactivated may be measured by means of temperature indicator 35 and passed to conduit 36. The warm and cold fluid streams then may be by-passed around heat exchanger 37 via conduit 38 including control valve 39, or all or a portion of the streams may be passed through heat exchanger 37 via conduit 40 including control valve 41 and cooled by means of a suitable coolant to thereby provide a desired relatively lower temperature in conduit 43. The warm and cold fluid streams are passed to compressor 42 via conduit 43 including heat exchanger 44, compressed, and then passed through a prior art after cooler (not shown) during the adsorber cool down cycle, if desired, or the streams may be passed directly to oil trap 45 via conduit 46 as shown in the drawing. A suitable fluid for heat exchange is passed to heat exchanger 44 via conduit 48 and withdrawn via conduit 47.

A substantially oil-free fluid stream of material is withdrawn from oil trap 45 via conduit 50 including open control valve 49 and, depending upon whether the adsorber to be reactivated is being warmed up or cooled down, the fluid stream is passed either to heater 51 via conduit 52 including control valve 53 or to heat exchanger 37 via conduit 54 including control valve 55. A warm fluid stream of reactivating material is withdrawn from heater 51 via conduit 56 or a cooled stream of fluid material is withdrawn from heat exchanger 37 via conduit 57, as the case may be depending upon the positions of valves 53 and 55, and passed to conduit 58. Where it is desirable, portions of a fluid stream may be passed through heater 51 and heat exchanger 37 in order to provide a fluid stream in conduit 58 having a desired temperature.

Depending upon whether the adsorber to be reactivated is being warmed up or cooled down, in accordance with one embodiment of the invention warm reactivating fluid flowing in conduit 56 from heater 51 may be passed directly via conduit 58 and control valve 60 to conduit 23 with control valve 61 being closed, or partially cooled fluid material flowing in conduit 57 from heat exchanger 37 may be passed to conduit 63 via conduit 58 upon closing control valve 60 and opening control valve 61. The partially cooled fluid material is then passed to cooling coil 64 which is immersed in a pool of liquid nitrogen 65 or other suitable coolant contained in vessel 66. A cooled stream of fluid material is withdrawn from cooling coil 64 via conduit 62 including control valve 61 and passed to conduit 23. Then, either a warmed stream of reactivating fluid or a cooled stream of fluid material as the case may be and depending upon whether the adsorber being reactivated is being warmed up or cooled down, is passed to adsorber 17 via conduit 23, conduit 24 including open control valve 26 and conduit 19. The stream of warm reactivating fluid or cooled fluid material is then passed through adsorber 17 in direct heat exchange effecting relation with the adsorbent, and withdrawn via conduit 12, conduit 29 including open control valve 28 and conduit 30. The streams are then recycled through the circuit as above described.

The above described procedure is satisfactory where it is not essential that impurities be purged during warm-up from conduit 62, conduit 63 and cooling coil 64, and where the warm and cold streams of fluid material do not contain a substance which tends to condense or freeze out in cooling coil 64. Where it is necessary to purge impurities from conduit 62, conduit 63 and cooling coil 64, and/or a substance collects as a liquid or solid in cooling coil 64, then upon commencing the warm-up cycle the coolant 65 in vessel 66 may be drained therefrom by means of conduit 68 upon opening valve 69. Valve 60 and valve 61 remain closed and open, respectively, during warm-up thereby allowing the warm reactivating fluid to flow through conduit 62, conduit 63 and cooling coil 64 for the purpose of removing collected liquid or solid phase impurities while the adsorber is being warmed-up. Then, during a subsequent purging step with impurity-free fluid material, the impurities remaining in conduit 62, conduit 63 and cooling coil 64 may be purged from the circuit.

Liquid nitrogen or other suitable coolant is passed to vessel 66 via conduit 70 including control valve 71 at a rate sufficient to maintain cooling coil 64 immersed in a pool of liquid nitrogen 65 when this is desirable such as during the cooldown operation. The pool of liquid nitrogen 65 in vessel 66 may be boiling under substantially atmospheric pressure and the gaseous nitrogen thus produced may be withdrawn via conduit 72 and passed to heat exchanger 37 via conduit 75 including control valve 76. The gaseous nitrogen passes through heat exchanger 37 in heat exchange effecting relation with fluid material in conduits 40 and/or 54 and it is then withdrawn via conduit 77 and passed to conduit 78 for bleeding to the atmosphere. If desired, gaseous nitrogen may be by-passed around heat exchanger 37 via conduit 73 upon closing valve 76 and opening valve 74.

A stream of fluid material for reactivation and/or purging may be supplied to the closed circuit above described via conduit 80 including control valve 81. In addition, it is also possible to provide means for supplying warm reactivating fluid directly to conduit 23 and for withdrawing the same via conduit 30, where this is desirable. Reactivating fluid material containing impurities or purging gas may be withdrawn from the closed cycle via conduit 82 upon opening control valve 83 and then bled to the atmosphere via conduit 84. A relief valve 85 in conduit 86 also is provided for the purpose of allowing fluid to be by-passed around closed valve 83 at any time when the pressure within conduit 82 exceeds a predetermined level. In instances where it is desirable that fluids within the closed circuit be exhausted, this may be effected by closing valves in the circuit providing access to the atmosphere, opening valve 90 in conduit 91, and applying suction thereto by means of suction device 92. Exhaust fluid is withdrawn from suction device 92 via conduit 93 and passed to the atmosphere.

For the purpose of illustrating the reactivation of an adsorber used in the purification of a stream of gaseous feed mixture in accordance with one embodiment of the present invention, it will be assumed that adsorber 16 is onstream and adsorber 17 is offstream for reactivation. Thus, control valves 14, 20, 26 and 28 are open, and valves 15, 21, 25 and 27 are closed. The gaseous mixture to be purified is passed to adsorber 16 via conduits 10 and 11 where impurities are removed, and then the impurity-free gas is withdrawn via conduits 18 and 22 and passed to a further processing step. Warm reactivating gas is passed to adsorber 17 via conduit 23, conduit 24 including open control valve 26 and conduit 19, and then through adsorber 17 in direct heat exchange effecting relation with the relatively cold adsorbent thereby warming the same and effecting desorption of the adsorbed impurities. Warm reactivating gas cooled somewhat by the relatively cold adsorbent and containing desorbed impurities is withdrawn from adsorber 17 via conduit 12, conduit 29 including open control valve 28 and conduit 30. Preferably, the gas is recirculated within the closed circuit since a smaller amount is required to warm up the adsorber and the power requirements are substantially reduced. When recirculating the warm-up reactivating gas, relatively cold gas flowing in conduit 30 is passed to temperature indicator 35 where the temperature is measured and then passed to compressor 42 via conduit 36, conduit 38 including open control valve 39, and conduit 43 including heat exchanger 44. Normally, during warm-up control valve 41 is closed and heat exchanger 37 is by-passed, but all or a portion of the gas may be passed through heat exchanger 37 via conduit 40 and cooled where it is desired to provide a relatively lower temperature in conduit 43 than would otherwise be possible.

After compression in compressor 42, which may be to a pressure approximately fifty pounds p.s.i. greater than the desired pressure in conduit 43, the warm-up reactivating gas is withdrawn via conduit 46 and passed to oil trap 45 where lubricating oils are removed. The oil-free reactivating gas is then withdrawn via conduit 50, and passed to heater 51 via conduit 52 and open control valve 53. During the warm-up operation, control valve 55 in conduit 54 is closed and heat exchanger 37 is by-passed. The heater 51 may be warmed by means of atmospheric air when the operating temperature for adsorbers 16 and 17 is at a relatively lower temperature, such as at a temperature to provide a temperature differential sufficient to effect the desired degree of reactivation. The relatively cool warm-up reactivating gas may be heated to a desired temperature such as room temperature while within heater 51, provided it has not been previously heated to the desired temperature by means of heat exchanger 44, and it is then withdrawn via conduit 56 and passed to conduit 58. The temperature of the gas within conduit 58, whether during the warm-up cycle or the cooldown cycle, may be controlled at a desired temperature by simultaneously passing controlled proportions through conduits 38 and 40, and/or through conduits 52 and 54. The warm-up reactivating gas is passed through open control valve 60 to adsorber 17 via conduit 23, conduit 24 including open control valve 26 and conduit 19. The resulting relatively cool reactivating gas is withdrawn from adsorber 17 via conduits 12, 29 and 30 and recycled as above described. During this operation, control valve 61 in conduit 62 may be closed and the cooling coil 64 in vessel 66 by-passed; or the coolant 65 may be drained from vessel 66 by means of conduit 68, valve 60 closed and valve 61 opened, and the reactivating gas passed from conduit 58 to conduit 23 via conduit 63, cooling coil 64, and conduit 62. The reactivating gas is recirculated in the closed circuit until adsorber 17 is warmed to a temperature at which the impurities are desorbed and the adsorber reactivated, as indicated by the temperature of the reactivating gas in conduit 30 measured by temperature indicator 35.

After the adsorber 17 is warmed up to a desired temperature, valve 83 in conduit 82 is opened and reactivating gas containing desorbed impurities is bled to the atmosphere via conduit 84. Also, a portion of the reactivating gas may be bled to the atmosphere by means of relief valve 85 in conduit 86 at any time during warm-up when the pressure increases above a predetermined level due to desorbed impurities and the increase in temperature. The control valve 83 is then closed and, if desired, valve 90 in conduit 91 is opened and suction applied to the circuit by means of suction device 92. Additional quantities of reactivating gas containing desorbed impurities are withdrawn and bled to the atmosphere via exhaust conduit 93.

Impurity-free gas may be fed to the closed circuit via conduit 80 upon closing control valves 90 and 49 and opening control valves 81 and 83 for the purpose of purging the circuit, the purge gas passing through the circuit and impurities being removed therewith via conduit 84. After impurities have been purged from the circuit, the circuit is then charged with an additional quantity of impurity-free gaseous material which may be the product withdrawn via conduit 22, and valves 81 and 83 are closed. The adsorber 17 is now ready for cooling down upon opening valve 49 to a temperature preferably approaching the operating temperature.

Cooldown of adsorber 17 may be effected by recirculating the charge of impurity-free gaseous material through the circuit, with cooling, until the adsorber 17 is cooled to the desired temperature. This is done by passing a stream of impurity-free gas for use during the cooldown cycle from conduit 30 to compressor 42 via conduit 36, conduit 38 including control valve 39 and/or conduit 40 including control valve 41, and conduit 43. During this operation, when it is desired to by-pass heat exchanger 37, valve 41 is closed and no gas flows through conduit 40. However, in instances where it is desirable, control valve 41 may be open and all or a portion of the gas used during the cooldown cycle may be passed through heat exchanger 37 to thereby provide a lower temperature within conduit 43. After compression within compressor 42 to a pressure which may be approximately 50 pounds above the pressure within conduit 43, compressed gas is withdrawn via conduit 46, passed through oil trap 45 where lubricating oils are removed, withdrawn via conduit 50, and passed via conduit 54 including open valve 55 to heat exchanger 37. While within heat exchanger 37, the gas passes in heat exchange effecting relation with gaseous nitrogen withdrawn from the vessel 66 and it is cooled thereby. During this operation, control valve 53 is closed and heater 51 is by-passed.

A partially cooled stream of gaseous material for the cooldown cycle is withdrawn from heat exchanger 37 via conduit 57 and passed via conduits 58 and 63 to cooling coil 64. During this operation, control valve 60 is conduit 58 is closed, control valve 61 in conduit 62 is open and the cooling coil 64 is immersed in a pool of coolant 65 in vessel 66 such as liquid nitrogen.

After passage through cooling coil 64, the resulting cold stream of gas is withdrawn via conduit 62 including open control valve 61 and passed via conduit 23, conduit 24 including open control valve 26 and conduit 19 to adsorber 17. The cooled stream of gas then passes in direct heat exchange effecting relation with the adsorbent within adsorber 17, and the adsorbent is thus cooled to a temperature approaching the temperature of the cooled gas. Relatively warmer gas is withdrawn via conduit 12 and passed via conduit 29 including open control valve 28 to conduit 30 where the temperature thereof is measured by means of temperature indicator 35, this temperature being an indication of the temperature within adsorber 17. The relatively warmer gas is then recycled in the circuit with cooling as above described until the adsorber 17 has reached a desired temperature which preferably should be the operating temperature or closely approach the operating temperature. Then, adsorber 17 is ready for placing back onstream at any time adsorber 16 requires reactivation.

When adsorber 16 requires reactivation, valves 14, 20, 26 and 28 are closed, and valves 15, 21, 25 and 27 are opened. Then, the gaseous feed mixture to be purified is passed via conduits 10 and 12 to adsorber 17 where impurities are removed, and pure gaseous product is withdrawn from adsorber 17 via conduits 19 and 22 for passage to a subsequent processing step. Adsorber 16 is reactivated and made ready for placing onstream by passing warm and cold fluids from conduit 23 to conduit 30 via conduit 24 including open control valve 25, conduit 18, adsorber 16, conduit 11, and conduit 29 including open control valve 27, as discussed above. The various steps comprising the reactivation process are then repeated for adsorber 16 as described hereinbefore for adsorber 17.

During the warm-up cycle, the warm-up fluid stream flowing in conduit 30 will be at approximately the temperature of normal operation of the adsorbers for most of the warm-up period. Inasmuch as this temperature may be as low as −335° F., usually it is desirable to warm the warm-up fluid stream by means of heat exchanger 44 before compression by compressor 42 using water or other suitable heating fluid in heat exchanger 44 as the heating medium. During the cooling cycle, the cooldown fluid stream flowing in conduit 30 is at approximately the temperature to which the adsorber was warmed during most of the warm-up cycle and heat exchanger 44 may serve to cool the cooldown fluid before compression by compressor 42. Thus, heat exchanger 44 may be operated in such a manner as to stabilize the temperature of the reactivating fluid feeds to compressor 42. In some instances, heater 51 may not be necessary during the warm-up period as the temperature of the warm-up fluid leaving compressor 42 is sufficiently high to effectively desorb the collected impurities from the adsorbent. However, heater 51 also may be used to heat the warm-up fluid to higher temperatures than normally required for reactivation, such as to about 300–350° F. when silica gel is the adsorbent, for the purpose of removing adsorbed water, carbon dioxide, etc. Following heating of the warm-up fluid to such high temperatures, the temperature of the cooldown fluid flowing in conduit 30 will be approximately 300–350° F. during most of the cooldown cycle and it is usually very desirable that it be cooled by means of heat exchanger 44 using water or other suitable cooling fluid as the cooling medium before compression by compressor 42. Generally, it is not necessary that reactivating fluid be passed through conduit 40 and, if so, usually it is near the end of the warm-up or cooldown cycle when the temperature of the reactivating fluid flowing in conduit 30 tends to increase or decrease due to the adsorber approaching the temperature of the entering reactivating fluid flowing in conduit 23.

At the time of switching adsorbers 16 and 17, the closed circuit is under a suitable pressure for reactivation which, preferably is a pressure approximating the operating pressure for the adsorbers. Thus, since the circuit is already charged with cold fluid material which is suitable for the warm-up cycle provided it is at the proper temperature, the warm-up cycle can commence immediately upon recirculation with heating and additional reactivating fluid for warm-up is not necessary. The method of the present invention is particularly advantageous in instances where large quantities of adsorbent normally are required and where it is desirable that the fluid feed mixture be purified under high pressure and at low temperature to produce a low temperature product under high pressure. The present invention also offers further important advantages where a suitable fluid, low temperature, substantially impurity-free by-product is not readily available for reactivation of the adsorbers and where a portion of the impurity-free product resulting from the purification step is used for this purpose. However, advantages are also obtained when the reactivating fluids are other suitable fluid substances. When reactivating adsorbers utilized in a purification step at low temperature and high pressure, it is preferred that the reactivation in both the warm-up and cooldown cycles take place at substantially the same pressure as used in operating the adsorbers since the period of reactivation may be decreased substantially. For best results, the pressure should be at least about 500 p.s.i.a. and a pressure of about 500–3000 p.s.i.a. generally is preferred. Also, reactivation of a plurality of adsorbers connected in series may be effected by passing the reactivating fluid through the series of adsorbers. This eliminates the requirement for the large amount of piping which is necessary for reactivation at low pressure when the reactivation is carried out on a plurality of adsorbers connected in parallel. In addition, it is possible to use smaller amounts of adsorbent in a given system since reactivation may be accomplished in a much shorter period of time.

Still other important advantages and features are present when operating in accordance with the method of the present invention. For example, it has been found that there is a substantial saving in horsepower by recirculating the warm and cold fluids in a closed cycle under high pressure since only minimum amounts by volume need be recirculated in order to achieve a desired temperature change in the adsorber. Even more important, in instances where fluids are a portion of the impurity-free product produced during the purification step, the over-all yield of product is increased substantially since much smaller amounts are required for reactivation of the adsorbers. This is due to a number of factors, among the more important being the retention of heat or cold in the recirculating streams at the small T1–T2 temperature differentials which exist at a point in the reactivation cycle when the adsorber reaches approximately the temperature desired. The heat or cold thus retained may be recovered upon recycling to thereby reduce the amount of fluid at a given temperature which is required to effect a given temperature change. This heat or cold otherwise would be lost to the atmosphere when following prior art practice. Additional savings in product are effected by exhausting the system following warm-up as only a small amount of pure product need be used in the subsequent purging operation to assure substantially complete removal of impurities.

It is expressly understood that the foregoing detailed description, the drawing, and the following specific example are for the purposes of illustration only, and are not intended as limiting to the spirit or scope of the appended claims.

*Example*

This example illustrates reactivation of an adsorber in accordance with a presently preferred embodiment of the invention. For the purpose of simplifying the discussion, the drawing will be referred to and it will be assumed that adsorber 16 is onstream and adsorber 17 is offstream for reactivation. Thus, valves 14, 20, 26 and 23 are open and valves 15, 21, 25 and 27 are closed.

The normally gaseous material to be purified was crude hydrogen under a pressure of about 1800 p.s.i.a. and at a temperature of about −335° F. which contained nitrogen as the main impurity and approximately 5000 p.p.m. of oxygen as an additional impurity. The total percentage of impurities was about 1.2 volume percent and thus the adsorbent requirement was high. Also, refrigeration was expensive since the adsorber operating temperature of −335° F. is below the boiling point of nitrogen under atmospheric pressure.

The crude hydrogen stream was passed via conduits 10 and 11 to adsorber 16, and then through absorber 16 in intimate contact with silica gel adsorbent contained therein. Substantially all of the nitrogen and oxygen content of the crude hydrogen stream was adsorbed by the silica gel and a substantially impurity-free stream of hydrogen was withdrawn via conduits 18 and 22. A major proportion of the withdrawn hydrogen stream was passed to a prior art process requiring a low temperature impurity-free hydrogen stream, while a minor proportion was used in reactivating the adsorbers. The temperature and pressure of the pure hydrogen product within conduit 22 were about −335° F. and 1800 p.s.i.a., respectively.

The adsorber 17 containing spent silica gel adsorbent was warmed to approximately room temperature. This was effected by recirculating warm gas under a pressure of about 1800 p.s.i.a. to adsorber 17 via conduits 23, 24 and 19. After passage through adsorber 17 in direct heat exchange effecting relation with the adsorbent, gas cooled by the relatively cold adsorbent was withdrawn via conduits 12, 29 and 30. The gas was then passed from conduit 30 to heater 51 via conduit 36, conduit 38 including open control valve 39, conduit 43 including heat exchanger 44, compressor 42, conduit 46, oil trap 45, conduit 50, and conduit 52 including open control valve 53, and heated to approximately room temperature. A stream of warm gas at about room temperature was withdrawn via conduit 56, and passed to conduit 23 via conduit 58, conduit 63, cooling coil 64 and conduit 62 including open control valve 60. The pool of liquid nitrogen 65 was drained from vessel 66 to prevent cooling of the warm gas upon passage through cooling coil 64. The gas was then recirculated through adsorber 17 as previously described. During recirculation of the warm gas, valves 15, 21, 25, 27, 41, 55, 61, 81, 83 and 90 were closed, and valves 26, 28, 39, 53 and 60 were open. The warm gas was recirculated until the adsorber 17 reached approximately room temperature. During the warm-up operation, due to gaseous impurities desorbed from adsorber 17 and the increasing temperature, the pressure within the system increased substantially and gas containing impurities was bled from the system via conduit 82, relief valve 85 and conduit 84 as necessary to maintain the pressure at about 1800 p.s.i.a. The compressor 42 was operated more as a blower than a compressor once the desired pressure was reached with the pressure differential between gas flowing in conduits 43 and 46 being about 50 p.s.i.

After warming up absorber 17, the circuit was bled to atmospheric pressure by opening valve 83 in conduit 82 and allowing the warm gas containing desorbed impurities to pass to the atmospere via conduit 84. Then, control valve 83 was closed and the circuit exhausted to 1-2 p.s.i.a. by means of suction device 92 upon opening control valve 90 in conduit 91. This procedure assured removal from the system via exhaust conduit 93 of substantially all of the warm gas and its impurity content.

After exhausting the system, valve 90 was closed and the remaining traces of impurities in the circuit were purged therefrom upon opening valves 81 and 83, closing valve 49 and passing impurity-free product gas to the circuit via conduit 80. After passing through the circuit, the gas was withdrawn by conduit 82 and bled to the atmosphere via conduit 84. The purging step was followed by recharging the circuit with impurity-free product gas to a pressure of about 1800 p.s.i.a.

Following warm up, the adsorber 17 was cooled to a temperature approaching the operating temperature of −335° F. by recirculating the charge of impurity-free hydrogen gas through the circuit with cooling. This was accomplished by passing the stream of impurity-free gas flowing in conduit 30 to compressor 42 via conduit 36, conduit 38 including open control valve 39, and conduit 43 including heat exchanger 44. The temperature of the gas within conduit 43 may be additionally controlled, where desirable, by passing all or a portion of the gas through heat exchanger 37 via conduit 40 and control valve 41. The compressed gas was withdrawn from compressor 42 via conduit 46 at a pressure of approximately 1850 p.s.i.a. and passed to oil trap 45 where lubricating oils, etc., were removed. Then, the gas was withdrawn via conduit 50 and passed via conduit 54 and open control valve 55 through heat exchanger 37 where it was passed in heat exchange effecting relation with gaseous nitrogen withdrawn from vessel 66 During this operation, control valve 53 in conduit 52 was closed and heater 51 by-passed. The partially cooled stream of reactivating fluid was withdrawn via conduit 57 and passed via conduit 58 to conduit 63 and cooling coil 64. During this step, the control valve 60 was closed and the cooling coil 64 was immersed in liquid nitrogen boiling under substantially atmospheric pressure. The stream of cold gas withdrawn from coil 64 via conduit 62 including open control valve 61 was at a temperature of approximately −328° F. and was passed to adsorber 17 via conduit 23, as previously described for the warm gas during the warm-up cycle. By recirculating the cold gas under a pressure of about 1800 p.s.i.a. through the circuit as previously described for the warm gas during the warm-up cycle, the adsorber 17 was cooled rapidly to a temperature approaching the operating temperature of −335° F. such as about −300° F. to −320° F. Thus, when the adsorber 17 was placed back onstream, a relatively small amount of crude hydrogen at the operating temperature of −335° F. was required for cooling the adsorber to the operating temperature. As a result, the pure product hydrogen flowing in conduit 22 was at substantially the desired temperature for use as feed to a subsequent processing step.

After cooldown, adsorber 17 was placed onstream and adsorber 16 offstream by closing valves 14, 20, 26 and 28, and opening valves 15, 21, 25 and 27. The cold gas remaining in the circuit then was heated and used during warm-up for adsorber 16, as previously described for adsorber 17.

What is claimed is:

1. A method of reactivating an adsorber of the class operated at low temperature to adsorb impurities from a gaseous stream and reactivated at a higher temperature to desorb the adsorbed impurities comprising the steps of desorbing impurities from an adsorber to be reactivated by warming the adsorber to a reactivating temperature at which impurities are desorbed, the adsorber being warmed by recirculating in a circuit for circulating fluid a warm stream of reactivating gas from which oil contaminants have been removed, the circuit including the adsorber, removing the reactivating gas containing impurities from the circuit, charging the circuit with a gaseous material for cooling the adsorber having a substantially lower impurity content than the impurity-containing reactivating gas which was removed from the circuit, cooling the gaseous material by passing at least a portion of the charge in the circuit in heat exchange effecting relation with a colder material, and cooling the adsorber by recirculating through the circuit at least a portion of the cooled gaseous material, both the reactivating gas and gaseous material for cooling the adsorber being recirculated at pressures not less than about 500 p.s.i.a.

2. The method of claim 1 wherein the adsorber is operated at a pressure not less than about 500 p.s.i.a., the reactivating gas is gas present in the adsorber at the time of taking the adsorber off-stream for reactivation, the adsorber is warmed by recirculating the reactivating gas in the circuit without substantial addition of reactivating gas until a reactivating temperature is reached, the circuit is purged with gaseous material having a relatively low impurity content after removal of reactivating gas containing impurities, and then gaseous material for purging the circuit is recirculated as the gaseous material for cooling the adsorber.

3. The method of claim 1 wherein the gaseous stream to be purified is air containing at least one impurity selected from the group consisting of carbon dioxide and hydrocarbons.

4. The method of claim 1 wherein the gaseous stream to be purified is a hydrogen-rich gaseous mixture containing at least one impurity selected from the group consisting of oxygen and nitrogen.

5. The method of claim 4 wherein the temperature of the hydrogen-rich gaseous mixture to be purified is lower than the boiling point of nitrogen at atmospheric pressure and the adsorber is operated at a pressure not less than about 500 p.s.i.a.

6. The method of claim 1 wherein the circuit is exhausted to remove reactivating gas containing impurities before it is charged with the gaseous material for cooling the adsorber.

7. The method of claim 1 wherein the circuit is purged with gaseous material having a relatively low impurity content after removal of reactivating gas containing impurities.

8. The method of claim 1 wherein the circuit is charged with a substantially impurity-free gaseous material for cooling the adsorber.

9. The method of claim 1 wherein the adsorber is cooled at least to a temperature in the vicinity of the operating temperature.

10. The method of claim 5 wherein the adsorber is cooled at least to a temperature in the vicinity of the operating temperature.

11. The method of claim 5 wherein the reactivating gas is gas present in the adsorber at the time of taking the adsorber off-stream for reactivation, the adsorber is warmed by recirculating the reactivating gas in the circuit without addition of a substantial amount of reactivating gas until a reactivating temperature is reached, the circuit is purged with gaseous material having a relatively low impurity content after removal of reactivating gas containing impurities, gaseous material for purging the circuit is recirculated as the gaseous material for cooling the adsorber, and the adsorber is cooled at least to a temperature in the vicinity of the operating temperature.

References Cited in the file of this patent

UNITED STATES PATENTS

| | | |
|---|---|---|
| 1,721,033 | Okochi | July 16, 1929 |
| 2,459,463 | Simpson | Jan. 18, 1949 |
| 2,518,409 | Williamson | Aug. 8, 1950 |
| 2,535,902 | Dailey | Dec. 26, 1950 |
| 2,747,681 | Schuftan et al. | May 29, 1956 |
| 2,790,248 | Dow | Apr. 30, 1957 |
| 2,815,089 | Turner | Dec. 3, 1957 |
| 2,880,818 | Dow | Apr. 7, 1959 |
| 2,882,998 | Grenier | Apr. 21, 1959 |